(12) United States Patent
Kobayashi et al.

(10) Patent No.: US 11,059,952 B2
(45) Date of Patent: Jul. 13, 2021

(54) RUBBER COMPOSITION FOR DOWNHOLE TOOLS AND MEMBER FOR DOWNHOLE TOOLS

(71) Applicant: Kureha Corporation, Tokyo (JP)

(72) Inventors: Fuminori Kobayashi, Tokyo (JP); Takuma Kobayashi, Tokyo (JP); Hikaru Saijo, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/498,930

(22) PCT Filed: Mar. 22, 2018

(86) PCT No.: PCT/JP2018/011365
§ 371 (c)(1),
(2) Date: Sep. 27, 2019

(87) PCT Pub. No.: WO2018/216334
PCT Pub. Date: Nov. 29, 2018

(65) Prior Publication Data
US 2020/0071486 A1    Mar. 5, 2020

(30) Foreign Application Priority Data

May 25, 2017    (JP) .............................. JP2017-103910

(51) Int. Cl.
*C08J 11/28* (2006.01)
*C08K 5/29* (2006.01)
(Continued)

(52) U.S. Cl.
CPC ............ *C08J 11/28* (2013.01); *C08K 5/0033* (2013.01); *C08K 5/29* (2013.01); *C08K 5/42* (2013.01);
(Continued)

(58) Field of Classification Search
CPC .. C08K 5/42; C08K 5/29; C08L 75/04; C08L 75/06; C08L 75/08
See application file for complete search history.

(56) References Cited

U.S. PATENT DOCUMENTS 3,658,637 A    4/1972  Danielson
6,153,718 A   11/2000  Imashiro et al.
(Continued)

FOREIGN PATENT DOCUMENTS

CN         1481414 A       3/2004
CN       101538225 A  *   9/2009
(Continued)

OTHER PUBLICATIONS

Machine translated English language equivalent of JP 2015071714 (2015, 38 pages).*
(Continued)

*Primary Examiner* — Brieann R Johnston
(74) *Attorney, Agent, or Firm* — Birch, Stewart, Kolasch & Birch, LLP

(57) ABSTRACT

A rubber composition for downhole tools having excellent degradability and storability is provided. The rubber composition for downhole tools includes degradable rubber, a degradation accelerator, and a degradation inhibitor. The degradation accelerator is at least one type of the compound represented by Formula (I) or Formula (II) below. The degradation inhibitor is at least one type selected from the group consisting of carbodiimide compounds, oxazoline compounds, oxazine compounds, and epoxy compounds. The content of the degradation accelerator is from 0.1 to 20 parts by mass relative to 100 parts by mass of the degradable rubber. The content of the degradation inhibitor is from 0.1 to 3 parts by mass relative to 100 parts by mass of the degradable rubber.

10 Claims, 1 Drawing Sheet

(51) Int. Cl.
  *C08K 5/42*   (2006.01)
  *E21B 29/02*  (2006.01)
  *E21B 33/12*  (2006.01)
  *C08L 75/06*  (2006.01)
  *C08L 75/08*  (2006.01)
  *C08K 5/00*   (2006.01)
  *C09K 8/42*   (2006.01)

(52) U.S. Cl.
  CPC .......... *C08L 75/06* (2013.01); *C08L 75/08* (2013.01); *C09K 8/426* (2013.01); *E21B 29/02* (2013.01); *E21B 33/12* (2013.01); *C08G 2190/00* (2013.01); *C08J 2367/00* (2013.01)

(56) References Cited

U.S. PATENT DOCUMENTS

| | | | |
|---|---|---|---|
| 6,299,789 | B1 | 10/2001 | Tatemoto et al. |
| 9,745,446 | B2 | 8/2017 | Shoji et al. |
| 10,280,699 | B2 | 5/2019 | Takahashi et al. |
| 2002/0120027 | A1 | 8/2002 | Lorenz et al. |
| 2005/0205266 | A1 | 9/2005 | Todd et al. |
| 2010/0132959 | A1 | 6/2010 | Tinker |
| 2011/0067889 | A1 | 3/2011 | Marya et al. |
| 2011/0277989 | A1 | 11/2011 | Frazier |
| 2012/0267111 | A1 | 10/2012 | Khlestkin |
| 2015/0376373 | A1 | 12/2015 | Shoji et al. |
| 2016/0281454 | A1* | 9/2016 | Zhu .......... E21B 33/12 |
| 2016/0298017 | A1* | 10/2016 | Takahashi ......... C09K 8/44 |
| 2016/0298412 | A1* | 10/2016 | Fripp .......... E21B 33/1294 |
| 2017/0016298 | A1* | 1/2017 | Takahashi .......... C08K 5/1575 |
| 2017/0260361 | A1 | 9/2017 | Shoji et al. |
| 2017/0369708 | A1* | 12/2017 | Kokel .......... C08K 7/02 |

FOREIGN PATENT DOCUMENTS

| | | | | |
|---|---|---|---|---|
| CN | 104371309 | A | 2/2015 | |
| CN | 105051107 | A | 11/2015 | |
| CN | 106030023 | A | 10/2016 | |
| DE | 19821668 | A1 * | 11/1999 | .......... C08K 5/29 |
| JP | 60-141701 | A | 7/1985 | |
| JP | H09272726 | A | 10/1997 | |
| JP | 2004526002 | A | 8/2004 | |
| JP | 2011-213374 | A | 10/2011 | |
| JP | 2015071714 | A | 4/2015 | |
| WO | WO 00/11258 | A1 | 3/2000 | |
| WO | WO2015098803 | A1 | 7/2015 | |
| WO | WO2015133545 | A1 | 9/2015 | |

OTHER PUBLICATIONS

Machine translation of CN 101538225 (2009, 7 pages).*
Google Patents translation of DE 19821668 (1999, 12 pages).*
International Search Report of the International Searching Authority for PCT/JP2018/011365 dated Jun. 19, 2018.
Translation of the International Search Report of the International Searching Authority for PCT/JP2018/011365 dated Jun. 19, 2018.
Examination Report under Section 18(3) of the Intellectual Property Office of the United Kingdom for GB1914107.6/PCT/JP2018/011365 dated Nov. 28, 2019.
Translation of the First Office Action of China National Intellectual Property Administration (CNIPA) for CN201880018421.3/PCT/JP2018/011365 dated Jan. 6, 2020; and translation of the First Search Report of China National Intellectual Property Administration (CNIPA) for CN201880018421.3/PCT/JP2018/011365 dated Dec. 26, 2019.
First Office Action of China National Intellectual Property Administration (CNIPA) for CN201880018421.3/PCT/JP2018/011365 dated Jan. 6, 2020.
Search Report of China National Intellectual Property Administration (CNIPA) for CN201880018421.3/PCT/JP2018/011365 dated Dec. 26, 2019.
International Preliminary Report on Patentability Chapter I for PCT/JP2018/011365 dated Dec. 5, 2019.
Translation of the International Preliminary Report on Patentability Chapter I for PCT/JP2018/011365 dated Dec. 5, 2019.
Chinese Second Office Action (including an English translation thereof) of the corresponding Chinese Patent Application No. 201880018421.3 dated Jun. 18, 2020.
European Patent Office Communication pursuant to Article 94(3) EPC issued in the corresponding European Patent Application No. 16878501.2 dated Jul. 6, 2020.
U.S. Office Action for U.S. Appl. No. 16/065,157, dated May 13, 2020.
Chinese Office Action and Search Report for Chinese Application No. 201680073783.3, dated Nov. 27, 2019, with English translation.
Database WPI, Week 201530, Thomson Scientific, London, GB; AN 2015-23857J, XP002785938, Feb. 25, 2014, 3 pages.
European Office Action for European Application No. 16878501.2, dated Dec. 12, 2019.
Extended European Search Report for European Application No. 16878501.2, dated Nov. 14, 2018.
International Preliminary Report on Patentability and English translation of the Written Opinion of the International Searching Authority for International Application No. PCT/JP2016/087179, dated Jul. 5, 2018.
International Search Report for International Application No. PCT/JP2016/087179, dated Mar. 21, 2017.
Examination Report issued in the corresponding United Kingdom Patent Application No. GB1914107.6 dated May 28, 2020.
Chinese Office Action, dated Oct. 10, 2020, for Chinese Application No. 201880018421.3, with an English translation.
European Office Action, dated Oct. 14, 2020, for European Application No. 16878501.2.

* cited by examiner

RUBBER COMPOSITION FOR DOWNHOLE TOOLS AND MEMBER FOR DOWNHOLE TOOLS

TECHNICAL FIELD

The present invention relates to a rubber composition, and particularly relates to a rubber composition for downhole tools and a member for downhole tools using the same.

BACKGROUND ART

Hydrocarbon resources such as petroleum or natural gas have come to be produced by excavation through wells (oil wells or gas wells, collectively called "wells") having a porous and permeable subterranean formation.

The equipment used in wells to perform well treatment, borehole plugging, and the like are referred to as downhole tools. A kind of the downhole tools is, for example, a member for downhole tools made of nitrile rubber that is a seal member for frac plugs or bridge plugs as downhole tools used for borehole plugging. Nitrile rubber in a member for downhole tools is non-degradable, so that the nitrile rubber seal member for downhole tools remains in a well, and the remaining nitrile rubber seal member can be an obstacle to the petroleum recovery pathway during petroleum production.

As a means for solving these problems, Patent Document 1 discloses a degradable rubber member for downhole tools, including a rubber material containing from 0.1 to 20 parts by mass of a degradation accelerator relative to 100 parts by mass of a degradable rubber.

Furthermore, Patent Document 2 discloses active introduction of carbodiimide bonds into polyurethane resin molecules. However, Patent Document 2 does not disclose any member for downhole tools.

CITATION LIST

Patent Document

Patent Document 1: WO 2015/133545
Patent Document 2: JP 9-272726 A

SUMMARY OF INVENTION

Technical Problem

The problems described above were found to be solved by the invention disclosed in Patent Document 1. However, according to the investigations of the inventors, it has been newly discovered that rubber members made of the rubber material disclosed in Patent Document 1 can cause problems in storability. Therefore, an object of the present invention is to provide a rubber composition for downhole tools having excellent storability and degradability.

Solution to Problem

In order to solve the problems described above, the rubber composition for downhole tools according to an aspect of the present invention includes degradable rubber, a degradation accelerator, and a degradation inhibitor. The degradation accelerator is at least one type of the compound represented by General Formula (I) or (II) below:

[Chemical Formula 1]

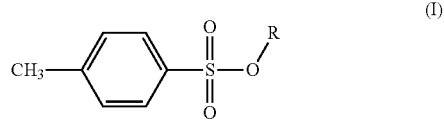

(wherein in Formula (I), R is an alkyl group having from 2 to 6 carbons)

[Chemical Formula 2]

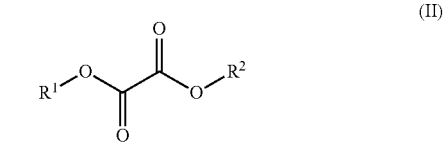

(wherein in Formula (II), $R^1$ and $R^2$ are each independently an alkyl group having from 1 to 5 carbon atoms or a phenyl group.)

The degradation inhibitor is at least one type selected from the group consisting of carbodiimide compounds, oxazoline compounds, oxazine compound, and epoxy compounds, and the content of the degradation accelerator is from 0.1 to 20 parts by mass relative to 100 parts by mass of the degradable rubber, and the content of the degradation inhibitor is from 0.1 to 3 parts by mass relative to 100 parts by mass of the degradable rubber.

Advantageous Effects of Invention

The present invention provides a rubber composition for downhole tools having excellent storability and degradability.

DESCRIPTION OF EMBODIMENTS

Figure 1:
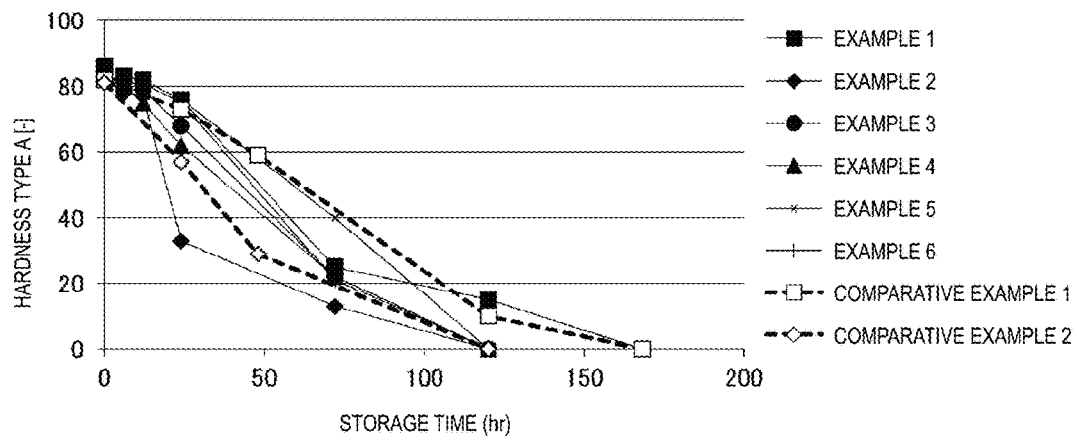
FIG. 1 is a graph illustrating the change in surface hardness of a rubber material sample relative to the storage time when the rubber material sample is stored for certain periods of time in a thermostatic apparatus set to a temperature of 66° C.

The rubber composition for downhole tools of one embodiment of the present invention includes degradable rubber, a degradation accelerator, and a degradation inhibitor, wherein the degradation accelerator is at least one compound represented by General Formula (I) or (II) below, and the degradation inhibitor is at least one type selected from the group consisting of carbodiimide compounds, oxazoline compounds, oxazine compounds, and epoxy compounds, and the content of the degradation accelerator is from 0.1 to 20 parts by mass relative to 100 parts by mass of the degradable rubber, and the content of the degradation inhibitor is from 0.1 to 3 parts by mass relative to 100 parts by mass of the degradable rubber.

[Chemical Formula 3]

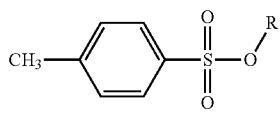

(I)

[Chemical Formula 4]

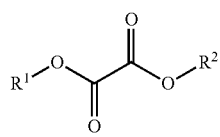

(II)

Firstly, various components included in the rubber composition for downhole tools will be described in order.

Degradable Rubber

Firstly, in the present specification, "degradability" means biodegradability to be degraded by microorganisms in the soil, or hydrolyzability to be degraded by a solvent such as a fracturing fluid, particularly water, or as desired with an acid or alkali, particularly hydrolyzability to be decomposed with water at certain temperature or higher, and furthermore degradability to be chemically degraded by any other method. Furthermore, "degradability" in the present specification also means easy disintegration to lose the shape (disintegrability) of the below-described member for downhole tools upon application of a very small mechanical force, which is caused by the decrease of intrinsic strength and embrittlement of rubber due to, for example, the decrease of the degree of polymerization.

Examples of the degradable rubber of the present embodiment include at least one type selected from the group consisting of urethane rubber, natural rubber, isoprene rubber, ethylene propylene rubber, butyl rubber, styrene rubber, acrylic rubber, aliphatic polyester rubber, chloroprene rubber, polyester-based thermoplastic elastomers, and polyamide-based thermoplastic elastomers.

From the perspective of degradability and disintegrability, the degradable rubber preferably has a hydrolyzable functional group. Examples of the hydrolyzable functional group include urethane groups, ester groups, amide groups, carboxyl groups, hydroxyl groups, silyl groups, acid anhydrides, and acid halides. In the present specification, "having a hydrolyzable functional group" means having any of the above-described functional groups as a bond that forms the main chain of the rubber molecule, or, for example, as a side chain of the rubber molecule serving as a crosslinking point. Examples of the preferred degradable rubber in the present embodiment include urethane rubber, polyester-based thermoplastic elastomers, and polyamide-based thermoplastic elastomers. For example, urethane rubber allows easy adjustment of its physical properties such as rubber structure, hardness, and the degree of crosslinking. Accordingly, the use of a rubber composition for downhole tools including urethane rubber as degradable rubber allows easy control of degradability, disintegrability, and the like of the below-described member for downhole tools. The urethane rubber, the polyester-based thermoplastic elastomer, and the polyamide-based thermoplastic elastomer of the present embodiment are described below in detail.

Urethane Rubber

Urethane rubber, also referred to as urethane elastomer, is a type of rubber material having a urethane bond (—NH—CO—O—) in the molecule. The urethane rubber is normally obtained by condensation reaction of an isocyanate compound with a compound having a hydroxyl group. Examples of the isocyanate compound used in the condensation reaction include aromatic, aliphatic, and alicyclic di-, tri-, or tetra-polyisocyanates or mixtures thereof. The aromatic may have a plurality of aromatic rings. Examples of the compound having a hydroxyl group used in the condensation reaction include polyester-type urethane rubber having an ester bond in its main chain (hereinafter may be simply referred to as "ester-type urethane rubber") and polyether-type urethane rubber having an ether bond in its main chain (hereinafter may be simply referred to as "ether-type urethane rubber"). In the present embodiment, the urethane rubber is preferably an ester-type urethane rubber because it is easier to control the degradability and disintegrability of the composition for downhole tools.

Depending on the molding method, urethane rubber can be classified into i) kneadable (millable) type, which can be molded by the same processing methods as general rubber; ii) thermoplastic type, which can be molded by the same processing methods as thermoplastic resin, and iii) cast type, which can be molded by thermosetting process methods using liquid starting materials. The urethane rubber of the present embodiment may be of any type. In particular, the molding technique for the iii) cast type urethane rubber is classified into two methods, the normal one-shot method and the prepolymer method. In the one-shot method, all reaction component starting materials are mixed by stirring in a reactor, the mixture is casted into a mold, and after the reaction is nearly completed by primary heat treatment, the product is released from the mold and then secondary heat treatment is performed. On the other hand, the prepolymer method is made up of two stages: a step of reacting polyol and diisocyanate in advance to synthesize a prepolymer, and a step of reacting the prepolymer with other material (e.g., a curing agent) to ultimately produce urethane rubber. According to the prepolymer method, the reaction proceeds uniformly. Therefore, there are many advantages such as the fact that urethane rubber with high physical properties is obtained, large-scale molding with low total heating value is possible, and segmented polyurethane with a freely selected curing agent can be produced.

Polyester-Based Thermoplastic Elastomer

The polyester-based thermoplastic elastomer is an elastomer composed mainly of a polyester-based block copolymer. Specific examples of the polyester-based thermoplastic elastomer include a block copolymer of a hard segment made of polyester and a soft segment made of a polyether (hereinafter the block copolymer is referred to as "first block copolymer"). Examples of the hard segment composing the first block copolymer include aromatic polyesters and aliphatic polyesters, and specific examples thereof include polyethylene terephthalate, polybutylene terephthalate, polyethylene naphthalate, polybutylene naphthalate, and polyhydroxyalkanoic acid. Examples of the soft segment composing the first block copolymer include polyethers such as polyethylene glycol, polypropylene glycol, and polytetramethylene ether glycol.

In the polyester-based thermoplastic elastomer, each of the hard segment and the soft segment may be a block copolymer composed of polyester (hereinafter the block copolymer is referred to as a "second block copolymer"). Examples of the hard segments composing the second block copolymer include aromatic polyesters, more specifically polyethylene terephthalate, polybutylene terephthalate, polyethylene naphthalate, and polybutylene naphthalate. Examples of the soft segment composing the second block copolymer include aliphatic polyesters having a lower elastic modulus than the hard segment. Specific examples thereof include polyhydroxyalkanoic acids having an alkyl chain length of 2 or more. In the first and second block copolymers, the types and the ratio of the hard segments and soft segments composing them may be adjusted so as to conform to the desired physical properties of the elastomer, particularly the desired degradation characteristics and mechanical characteristics. Furthermore, the polyester-based thermoplastic elastomer may be combined with various compounding agents as necessary to obtain desired physical properties. The polyester-based thermoplastic elastomer has the characteristics of both plastic and rubber, and can be molded by mold processing techniques such as injection molding, extrusion molding, or blow molding. In addition, the polyester-based thermoplastic elastomer has ester bonds, and thus can be easily degraded and disintegrated.

Polyamide-Based Thermoplastic Elastomer

The polyamide-based thermoplastic elastomer is a block copolymer including hard segments composed of a polyamide and soft segments composed of a polyether and/or a polyester (the block copolymer is hereinafter referred to as a "third block copolymer"). Examples of the hard segment composing the third block copolymer include aliphatic polyamides, and specific examples thereof include nylon 6, nylon 11, and nylon 12. Examples of the soft segments composing the third block copolymer include polyethers such as polyethylene glycol, polypropylene glycol, and polytetramethylene ether glycol. In the third block copolymer, the types and the proportions of these hard segments and soft segments may be adjusted so as to conform to the desired physical properties of the elastomer, particularly the desired degradation characteristics and mechanical characteristics. Furthermore, the polyamide-based thermoplastic elastomer may be combined with various compounding agents as necessary to obtain desired physical properties. The polyamide-based thermoplastic elastomer can be molded by various mold processing techniques such as injection molding, extrusion molding, and blow molding. In addition, since the polyamide-based thermoplastic elastomer has amide bonds, it is hydrolyzed and easily degraded and disintegrated at high temperatures and high pressures.

Degradation Accelerator

The degradation accelerator of the present embodiment will be described below. The degradation accelerator in the present embodiment adjusts the degradation rate of the degradable rubber, and specifically, has a function to promote a reaction that cuts the main chains of the rubber molecules of the degradable rubber or to plasticize the degradable rubber. The degradation accelerator of the present embodiment is at least one type of the compounds represented by General Formula (I) or (II) described above. The degradation accelerator is preferably a compound that promotes hydrolysis.

The compound represented by Formula (I) (hereinafter may be referred to as "compound (I)"), and a compound represented by Formula (II) (hereinafter may be referred to as "compound (II)") will be described below in detail.

Compound (I)

Compound (I) is a compound represented by General Formula (I):

[Chemical Formula 5]

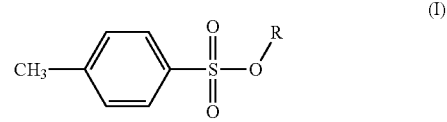

Wherein in Formula (I), R is an alkyl group having from 2 to 6 carbons. The alkyl group having from 2 to 6 carbons may be linear or branched. Specific examples of the alkyl group having from 2 to 6 carbons include an ethyl group, a propyl group, an isopropyl group, a n-butyl group, an isobutyl group, a tert-butyl group, a n-pentyl group, an isopentyl group, a tert-pentyl group, a sec-pentyl group, a n-hexyl group, and an isohexyl group.

Wherein in Formula (I), R is preferably an alkyl group having from 2 to 4 carbons, more preferably an alkyl group having from 2 or 3 carbons, and even more preferably an ethyl group. R is preferably an ethyl group, a butyl group, or a hexyl group in the compound (I) from the perspective of low cost, ease of availability, safety, and storage stability.

In Formula (I) above, when R is an ethyl group, the compound (I) has a p-toluene sulfonate ester structure and produces an acid by hydrolysis. This acid acts as a catalyst to facilitate the hydrolysis reaction that breaks the bonds of the main chain of the rubber molecules of the degradable rubber, thereby promoting degradation of the rubber composition for downhole tools. In addition, the decomposition of the compound (I) by hydrolysis proceeds even with moisture or the like in the air. In the compound (I), in Formula (I), the alkyl group of R has 2 or more carbon atoms, hydrolysis is suppressed in comparison with, for example, methyl p-toluene sulfonate (MTPS) having an alkyl group having 1 carbon atom, whereby the hydrolysis rate of the degradable rubber can be delayed to some extent.

<Compound (II)>

The compound (II) is represented by General Formula (II) below:

[Chemical Formula 6]

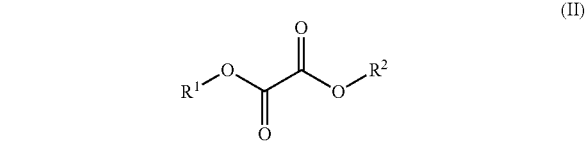

Wherein in the formula (II), $R^1$ and $R^2$ are each independently an alkyl group having from 1 to 5 carbon atoms, or a phenyl group. The alkyl group from 1 to 5 carbon atoms may be linear or branched. Specific examples of the alkyl group having from 1 to 5 carbon atoms include an ethyl group, a propyl group, an isopropyl group, a n-butyl group, an isobutyl group, a tert-butyl group, a n-pentyl group, an isopentyl group, a tert-pentyl group, and a sec-pentyl group.

In Formula (II), $R^1$ and $R^2$ are preferably each independently an alkyl group having from 1 to 4 carbon atoms, more preferably an alkyl group having from 1 to 3 carbon atoms, and particularly preferably a methyl group or an ethyl group.

In Formula (II), when both of $R^1$ and $R^2$ are methyl groups, the compound (II) is dimethyl oxalate. In Formula (II), when both of $R^1$ and $R^2$ are ethyl groups, the compound (II) is diethyl oxalate. $R^1$ and $R^2$ may be the same or different from each other. From the perspective of low cost, ease of availability, safety, and storage stability, in Formula (II), $R^1$ and $R^2$ are preferably each independently a methyl group, an ethyl group, a propyl group, or a butyl group, and $R^1$ and $R^2$ are more preferably the same.

The compound (II) has an oxalic acid ester structure, and thus generates an acid by hydrolysis. This acid acts as a catalyst to facilitate the hydrolysis reaction that cuts the bonds of the main chains of the rubber molecules of the degradable rubber included in the rubber composition for downhole tools.

The melting point of the compound (II) is not particularly limited, but is preferably from −60° C. to 80° C., more preferably from −50° C. to 70° C., and even more preferably from −45° C. to 60° C. When the melting point of the compound (II) is within this temperature range, the time required for compatibilization with a prepolymer heated to a predetermined temperature, for example, 100° C., can be reduced in the process of producing the rubber composition for downhole tools.

The rubber composition for downhole tools of the present embodiment includes a degradation accelerator in an amount of from 0.1 to 20 parts by mass, preferably from 0.3 to 15 parts by mass, and more preferably from 0.5 to 10 parts by mass relative to 100 parts by mass of the degradable rubber. The content of the degradation accelerator in this range is preferable from the perspective that the rubber strength can be reduced at a low temperature and in a short period of time due to the application of the degradation accelerating effect.

When the rubber composition for downhole tools includes both of the compound (I) and the compound (II), the content ratio between them is not particularly limited, but is preferably from 1:99 to 99:1 by mass.

Degradation Inhibitor

The degradation inhibitor in the present embodiment is a compound that reacts with a carboxyl group, hydroxyl group, or water, and at least one type selected from the group consisting of carbodiimide compounds, oxazoline compounds, oxazine compounds, and epoxy compounds. Examples of the carbodiimide compound include N,N-2,6-diisopropylphenylcarbodiimide and N,N'-dicyclohexylcarbodiimide. Examples of the oxazoline compound include 2,2'-m-phenylenebis(2-oxazoline). Examples of the oxazine compound include 2-methoxy-5,6-dihydro-4H-1,3-oxazine. Examples of the epoxy compound include N-glycidylphthalimide and cyclohexene oxide.

The rubber composition for downhole tools includes the degradation inhibitor in an amount of from 0.1 to 3 parts by mass, preferably from 0.2 to 2.9 parts by mass, and more preferably from 0.2 to 2.8 parts by mass with reference to 100 parts by mass of the degradable rubber. The content of the degradation accelerator in this range is preferable from the perspective that the decrease of the strength of the degradable rubber can be suppressed during storage before actual use without impairing the degradation rate of the degradable rubber in a solvent such as a fracturing fluid during actual use.

When the rubber composition for downhole tools includes a plurality of types of degradation inhibitors, the content ratio of these degradation inhibitors is not particularly limited.

The content ratio between the degradation accelerator and the degradation inhibitor in the rubber composition for downhole is preferably from 1:10 to 10:1 by mass from the perspective of achieving both of degradability and storability.

The rubber composition for downhole tools of the present embodiment may further include an optional component within a range that will not impair the effect of the rubber composition for downhole tools. Examples of the optional component include plasticizers, curing agents, reinforcing materials, acidic substances, and other resins. These optional components are described below in detail.

Plasticizer

The plasticizer has a function of plasticizing the degradable rubber, specifically, reducing the torque, softening, and other functions. In a case where a member for downhole tools is made using the rubber composition for downhole tools including a plasticizer, penetration of water (which may contain an acidic substance or an alkaline substance) into the member for downhole tools is promoted. Therefore, in a case where the member for downhole tools is made from the composition for downhole tools including a plasticizer, degradation of the degradable rubber in the member for downhole tools likely progresses faster than in the case where degradation progresses from the surface of the downhole tools.

Examples of the plasticizer include dibutyl phthalate, diisononyl phthalate, dioctyl phthalate, dioctyl adipate, diisononyl adipate, and dibutyl sebacate.

The content of the plasticizer in the rubber composition for downhole tools is not particularly limited. The required amount may be appropriately added as necessary in accordance with the required rubber hardness.

Curing Agent

The curing agent may be a known curing agent. Examples of the curing agent include 3,3'-dichloro-4,4'-diaminodiphenylmethane (MOCA), dimethylthiotoluenediamine, isophoronediamine, piperazine, 1,3-propanediol, 1,4-butanediol, 1,6-hexanediol, neopentyl glycol, 1,4-cyclohexanedimethanol, hydroquinone di(2-hydroxyethyl ether), 1,1,1-trimethylolpropane, and glycerin.

The content of the curing agent in the rubber composition for downhole tools is not particularly limited, but normally, the content of the curing agent is from 0.1 to 20 parts by mass relative to 100 parts by mass of the degradable rubber.

Reinforcing Material

The reinforcing material may be a known reinforcing material used for the purposes of, for example, the increase of mechanical strength and heat resistance. Examples of the reinforcing material include fibrous reinforcing materials, granular or powdered reinforcing materials.

Examples of the fibrous reinforcing material include inorganic fibrous substances such as glass fibers, carbon fibers, asbestos fibers, silica fibers, alumina fibers, zirconia fibers, boron nitride fibers, silicon nitride fibers, boron fibers, and potassium titanate fibers; metal fibrous substances such as stainless steel, aluminum, titanium, steel, and brass; and organic fibrous substances with a high melting point such as aramid fibers, kenaf fibers, polyamides, fluorine resins, polyester resins, and acrylic resins. The fibrous reinforcing material is preferably an inorganic fibrous material, and more preferably a glass fiber. The length of the fibrous reinforcing material is preferably 10 mm or less, and preferably from 1 to 6 mm, and more preferably from 1.5 to 4 mm short fibers. Examples of the granular or powdered reinforcing material include mica, silica, talc, alumina, kaolin, calcium sulfate, calcium carbonate, titanium oxide, ferrite, clay, glass powder (e.g., milled fiber), zinc oxide, nickel carbonate, iron oxide, quartz powder, magnesium carbonate, and barium sulfate. These reinforcing materials may be each used alone or in combinations of two or more types. The reinforcing material may be treated with a sizing agent or surface treatment agent as necessary.

In a case where a member for downhole tools is made from a rubber composition for downhole tools including a reinforcing material, the member for downhole tools is favorably used for the period required for well drilling even in an environment where the downhole environment is close to the melting point (that is, the melting softening point) of the degradable rubber.

The content of the reinforcing material in the rubber composition for downhole tools is not particularly limited, but normally, the content of the reinforcing material is from 1 to 50 parts by mass relative to 100 parts by mass of the degradable rubber.

Other Resin

Examples of the other resin include degradable polymers other than degradable rubber, and non-degradable resins. In the case where the other resin is desired to promote the loss of the sealing function of the member for downhole tools, preferable examples of the other resin include polyglycolic acid, stereocomplex polylactic acid, polybutylene succinate, polybutylene adipate/terephthalate, and polybutylene succinate/adipate. Examples of the nondegradable resin include thermoplastic resins such as aromatic polyesters (e.g., polyethylene terephthalate) and polystyrenes; nitrile rubber, hydrogenated nitrile rubber, and ethylene-propylene-diene terpolymer (EPDM).

The content of the other resin in the rubber composition for downhole tools is not particularly limited, but is preferably from 0.1 to 100 parts by mass relative to 100 parts by mass of the degradable rubber.

Characteristics of Rubber Composition for Downhole Tools

As described above, the rubber composition for downhole tools of the present embodiment includes a specific degradation accelerator and a specific degradation inhibitor in specific amounts with reference to the degradable rubber, whereby its tensile strength at break is not less than a prescribed value even if stored in air for a certain time. Additionally, the degradation behavior of the rubber composition for downhole tools in a well fluid is comparable to that of degradable rubber including only a degradation accelerator. Specifically, when the rubber composition for downhole tools is stored for 7 days in air at 30° C. and 90% RH, the strength required for the rubber varies depending on the temperature during actual use, but the tensile strength at break of the rubber composition for downhole tools is 5 MPa or greater, and preferably 10 MPa or greater. The tensile strength at break is a value measured at 23° C. and 50% RH.

The surface hardness of the rubber composition for downhole tools of the present embodiment is A60 or greater and 100 or less using a durometer of hardness type A at a measurement temperature of 23° C.

The rubber composition for downhole tools of the present embodiment has the characteristics described above, and thus can be provided as a rubber composition having excellent storability in air and a rapid degradation in a well.

Preparation of Rubber Composition for Downhole Tools

The preparation of the rubber composition for downhole tools is not particularly limited, and may be prepared by, for example, mixing the various components described above in a conventional manner.

Production of Member for Downhole Tools

The member for downhole tools of the present embodiment means various members used in the well drilling process. Specific examples of the member for downhole tools include seal members and protective members used in frac plugs and bridge plugs, and balls such as fracturing balls and perforating balls.

The method for producing the member for downhole tools is not particularly limited, and the downhole tool member can be produced using a rubber composition for downhole tools using, for example, injection molding, extrusion molding (including solidifying extrusion molding), centrifugal molding, compression molding, or other known molding method.

Characteristics of Member for Downhole Tools

The member for downhole tools of the present embodiment is degraded in a downhole environment, specifically, mainly in water at about 60° C. (140° F.) to 204° C. (400° F.), and recently at low temperatures at about 25 to 40° C. within several hours to several weeks, or within several days as desired. Therefore, the use of the member for downhole tools completely eliminate operations such as recovering or physically destroying the member for downhole tools in well drilling. Furthermore, the member for downhole tools of the present embodiment has excellent storability because the decrease in the tensile strength at break of the degradable rubber is slight.

SUMMARY

The rubber composition for downhole tools according to an aspect of the present invention includes degradable rubber, a degradation accelerator, and a degradation inhibitor, wherein the degradation accelerator is a compound represented by General Formula (I) or (II) below, the degradation inhibitor is at least one type selected from the group consisting of carbodiimide compounds, oxazoline compounds, oxazine compounds, and epoxy compounds, the content of the degradation accelerator is from 0.1 to 20 parts by mass relative to 100 parts by mass of the degradable rubber, and the content of the degradation inhibitor is from 0.1 to 3 parts by mass relative to 100 parts by mass of the degradable rubber:

[Chemical Formula 7]

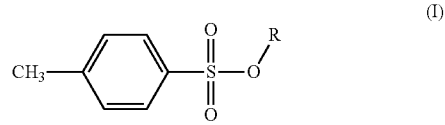

(I)

(wherein in Formula (I), R is an alkyl group having from 2 to 6 carbon atoms)

[Chemical Formula 8]

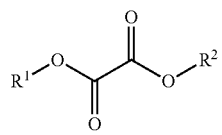

(II)

(wherein in Formula (II), $R^1$ and $R^2$ are each independently an alkyl group having from 1 to 5 carbon atoms, or a phenyl group)

In Formula (I), R is preferably an ethyl group, a butyl group, or a hexyl group.

In Formula (II), $R^1$ and $R^2$ are preferably each independently a methyl group, an ethyl group, a propyl group, or a butyl group.

Furthermore, the degradable rubber preferably has a hydrolyzable functional group.

The present invention also provides a member for downhole tools made using the rubber composition for downhole tools described above.

EXAMPLES

An embodiment of the present invention will be described below in further detail with reference to examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention.

Example 1

Raw Material

PANDEX 380E (available from DIC Corporation), which is a polyester-based prepolymer, was used as degradable rubber. Ethyl p-toluene sulfonate (EPTS) (available from Tokyo Chemical Industry Co., Ltd.) was used as the degradation accelerator. Bis(2,6-diisopropylphenyl) carbodiimide (CDI) (Stabaxol I, available from Rhein Chemie) was used as the degradation inhibitor. 3,3'-dichloro-4,4'-diaminodiphenylmethane (MOCA) was used as the curing agent.

Method for Preparing Composition for Rubber Material

PANDEX 380E was heated to 100° C. and CDI was added thereto under stirring in an amount of 1 part by mass with reference to 100 parts by mass of PANDEX 380E, stirred for 5 minutes, and defoamed by vacuum drawing. Thereafter, EPTS was added in an amount of 3 parts by mass with reference to 100 parts by mass of PANDEX 380E. Subsequently, MOCA was added in an amount of 9.8 parts by mass relative to 100 parts by mass of PANDEX 380E, stirred for 5 minutes at 100° C., thereby preparing a rubber material composition.

Formation of Rubber Material Sample

The resulting rubber material composition was poured into a mold. The rubber material composition was cured by heating at a temperature of 85° C., thus producing a solid rubber material sample.

Example 2

A rubber material composition was produced in the same manner as in Example 1, except that 5 parts by mass of EPTS was added to 100 parts by mass of PANDEX 380E.

Example 3

A rubber material composition was produced in the same manner as in Example 1, except that 3 parts by mass of CDI and 5 parts by mass of EPTS were added to 100 parts by mass of PANDEX 380E.

Example 4

A rubber material composition was produced in the same manner as in Example 1, except that 4 parts by mass of EPTS was added to 100 parts by mass of PANDEX 380E.

Example 5

A rubber material composition was produced in the same manner as in Example 1, except that 2 parts by mass of CDI and 4 parts by mass of EPTS were added to 100 parts by mass of PANDEX 380E.

Example 6

A rubber material composition was produced in the same manner as in Example 1, except that 3 parts by mass of CDI and 4 parts by mass of EPTS were added to 100 parts by mass of PANDEX 380E.

Comparative Example 1

A rubber material sample was produced in the same manner as in Example 1, except that CDI was not added.

Comparative Example 2

A rubber material sample was produced in the same manner as in Example 2, except that CDI was not added.

Figure 2:
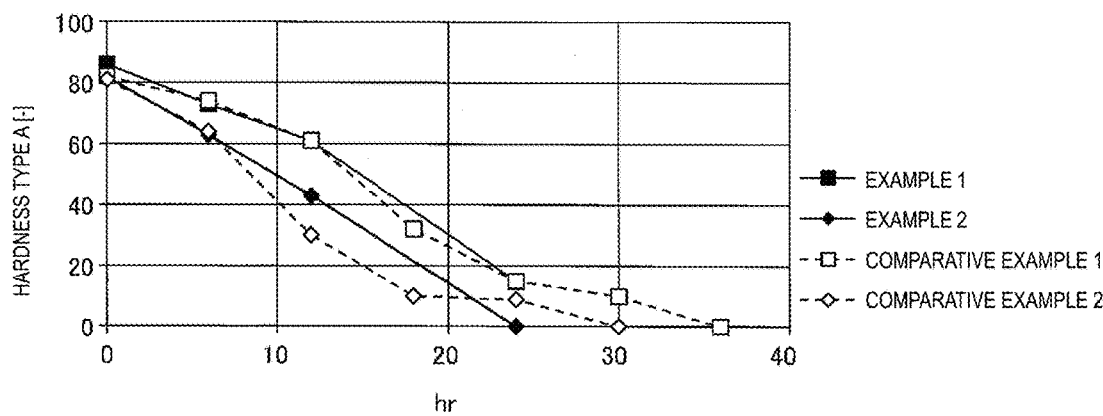
FIG. 2 is a graph illustrating the change in surface hardness of a rubber material sample relative to the storage time when the rubber material sample is stored for certain periods of time in a thermostatic apparatus set to a temperature of 80° C.

Evaluation Test 1: Degradation Test of Rubber Material Sample by Immersion in Water The surface hardness of the degradable rubber material decreases with the development of degradability. Therefore, the degradability of the rubber material samples was evaluated by measuring the surface hardness as an indicator of degradation. Specifically, the rubber material samples of Examples 1 to 6 and Comparative Examples 1 and 2 were immersed in water, whereby the degradation test of the rubber material samples was performed. The operating procedures are as follows:

A rubber material sample cut in a shape of approximately 2 mm×2 mm×2 mm and 50 ml of ion exchanged water were placed in a 50-ml vial, and stored in a thermostatic apparatus set to temperatures of 66° C. (150° F.) and 80° C. (175° F.) for a fixed period of time. The rubber material samples were taken out from the vial at regular intervals. The rubber material taken out was subjected to solid-liquid separation using a filter. The solid product obtained after separation was placed in a dry room at a dew point of −40° C. or lower, and dried for 12 hours. After drying, the surface hardness of the rubber material sample was measured using a durometer type A (GS-719 N, available from TECLOCK Co., Ltd.). The surface hardness was measured 3 seconds after application of a 5-kg load. In addition, the surface hardness was measured 0 day (before immersion), 6 hours, 12 hours, 24 hours (1 day), 72 hours (3 days), 120 hours (5 days), and 168 hours (7 days) after initiation of immersion. The surface hardness was used as an indicator to evaluate the degradability after using the rubber material sample as a member for downhole tools. The results are shown in Tables 1 and 2 and FIGS. 1 and 2. Table 1 and FIG. 1 show the changes in the surface hardness of the rubber material samples relative to the storage time when the rubber material samples were stored for certain periods of time in a thermostatic apparatus set to a temperature of 66° C. Table 2 and FIG. 2 show the changes in the surface hardness of the rubber material samples relative to the storage time when the rubber material samples were stored for certain periods of time in a thermostatic apparatus set to a temperature of 80° C.

TABLE 1

| Immersion time (hr) | Example 1 | Example 2 | Example 3 | Example 4 | Example 5 | Example 6 | Comparative Example 1 | Comparative Example 2 |
|---|---|---|---|---|---|---|---|---|
| 0 | 86 | 82 | 82 | 84 | 83 | 84 | 82 | 81 |
| 6 | 83 | 78 | 79 | 80 | — | 81 | — | — |
| 12 | 82 | 77 | 79 | 75 | — | 81 | — | — |
| 24 | 76 | 33 | 68 | 62 | 76 | 75 | 73 | 57 |
| 48 | — | — | — | — | — | — | 59 | 29 |
| 72 | 25 | 13 | 22 | 22 | 40 | 21 | — | — |
| 120 | 15 | 0 | 0 | 0 | 0 | 0 | 10 | — |
| 168 | 0 | — | — | — | — | — | 0 | 0 |

TABLE 2

| Immersion time (hr) | Example 1 | Example 2 | Comparative Example 1 | Comparative Example 2 |
|---|---|---|---|---|
| 0 | 86 | 82 | 82 | 81 |
| 6 | 73 | 63 | 74 | 64 |
| 12 | 61 | 43 | 61 | 30 |
| 18 | — | — | 32 | 10 |
| 24 | 15 | 0 | 15 | 9 |
| 30 | — | — | 10 | 0 |
| 36 | — | — | 0 | — |
| 72 | 0 | 0 | — | — |

These results indicate that the rubber material sample including a degradation inhibitor in addition to a degradation accelerator and the rubber material sample including only the degradation accelerator exhibit comparable decreases in their surface hardness. From these results, it can be said that a member for downhole tools made from a rubber composition for downhole tools including a degradation inhibitor in addition to a degradation accelerator is convenient because it will not cause degradation delay by immersion in a well fluid.

Evaluation Test 2: Rubber Material Sample Storability Evaluation Test

The seal member, which is one of the members for downhole tools, needs to exert its sealing function by application of a stress on the seal member for deformation. At this time, in a case where the seal member is broken by the applied stress, the intended sealing performance cannot be exerted. Accordingly, in storage of a member for downhole tools, the material forming the member for downhole tools is required to have a low decrease in tensile strength at break due to changes over time. Therefore, assuming the storage of the member for downhole tools in air, the tensile strength at break of the rubber material samples of Examples 1 and 3 to 6 and Comparative Example 1 retained under 30° C. and 90% RH conditions was measured.

Specifically, tensile dumbbell test pieces (total length: 100 mm, gauge length: 20 mm, and constriction section: 5 mm) were made from the rubber material samples of Examples 1 and 3 to 6 and Comparative Example 1, and stored for certain periods of time in a constant temperature and humidity machine set to 30° C. and −90% RH. The dumbbell test pieces were taken out after storage for 0 days, 7 days, 14 days, and 30 days. The dumbbell test pieces thus taken out were measured for the tensile stress using a precision tensile tester (AG-X/R, manufactured by Shimadzu Corporation) at 23° C. and a tensile speed of 500 mm/min with the value at the point of breakage the maximum point stress. The maximum point of the tensile stress was recorded as the tensile strength at break.

Figure 3:
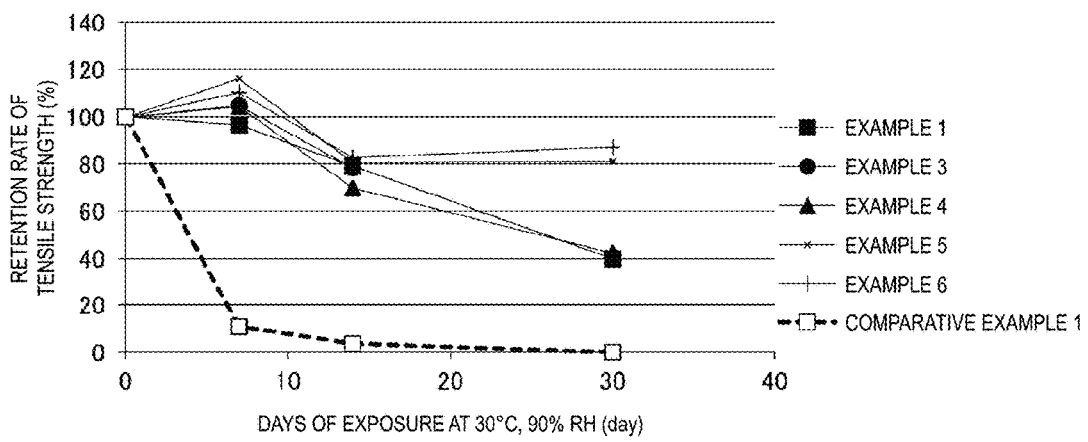
FIG. 3 is a graph illustrating the relationship of the retention rate of the tensile strength of a rubber material sample relative to the storage time under 30° C. and 90% RH conditions.

The tensile stress was used as an indicator to evaluate the storability as the mechanical properties required when the member for downhole tools is a seal member. After elapse of 7 days, those having a break point stress of 80% or more relative to the initial value were passed. The results are shown in Table 3, Table 4, and FIG. 3. Table 3 shows the actual values, and Table 4 shows the retention ratios. The retention ratios are obtained by determining the ratio of the actual values shown in Table 3 to the initial tensile strength at break as 100%. FIG. 3 shows the relationship between the retention ratios of the tensile strength at break of the rubber material sample relative to the storage time under 30° C. and 90% RH conditions.

TABLE 3

| Immersion time (day) | Example 1 | Example 3 | Example 4 | Example 5 | Example 6 | Comparative Example 1 |
|---|---|---|---|---|---|---|
| 0 | 35.8 | 27.2 | 32.1 | 31.7 | 29.0 | 35.8 |
| 7 | 34.6 | 28.5 | 33.5 | 36.8 | 32.0 | 3.9 |
| 14 | 28.3 | 21.3 | 22.4 | 25.6 | 24.0 | 1.3 |
| 30 | 14.3 | — | 13.6 | 25.7 | 25.3 | 0.0 |

TABLE 4

| Immersion time (day) | Example 1 | Example 3 | Example 4 | Example 5 | Example 6 | Comparative Example 1 |
|---|---|---|---|---|---|---|
| 0 | 100.0 | 100.0 | 100.0 | 100.0 | 100.0 | 100.0 |
| 7 | 96.6 | 104.8 | 104.4 | 116.1 | 110.3 | 10.9 |
| 14 | 79.1 | 78.3 | 69.8 | 80.8 | 82.8 | 3.6 |
| 30 | 39.9 | — | 42.4 | 81.1 | 87.2 | 0.0 |

From Tables 3 and 4 and FIG. 3, the rubber material sample according to Comparative Example 1 was failed, whereas the rubber material samples according to Examples 1 and 3 to 6 were passed.

INDUSTRIAL APPLICABILITY

The rubber composition for downhole tools of the present invention can be used in the production of a member for downhole tools. The rubber composition for downhole tools of the present invention deteriorates and degrades within a predetermined period of time in a well fluid. Therefore, when the rubber composition according to an embodiment of the present invention is used as a seal member used in frac plugs, bridge plugs, and the like, the seal member will be decomposed and removed by the time of petroleum production, so that no obstruction to petroleum production due to seal member residues will occur. In addition, since the rubber composition for downhole tools of the present invention has a small decrease in strength due to storage in air, the seal member or the like made from the rubber composition for downhole tools of the present invention can exert sealing performance required in a well even when the storage period is prolonged.

The invention claimed is:

1. A rubber composition for downhole tools comprising:
a degradable rubber;
a degradation accelerator; and
a degradation inhibitor, wherein
the degradable rubber is urethane rubber,
the degradation accelerator is at least one type represented by General Formula (I):

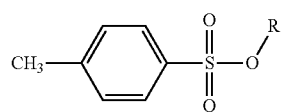

(I)

wherein in Formula (I), R is an alkyl group having from 2 to 6 carbon atoms,
the degradation inhibitor is a carbodiimide compound,
the content of the degradation accelerator is from 0.1 to 20 parts by mass relative to 100 parts by mass of the degradable rubber,
the content of the degradation inhibitor is from 0.1 to 3 parts by mass relative to 100 parts by mass of the degradable rubber,
the content by mass of the degradation accelerator is 4/3 to 5 times the content by mass of the degradation inhibitor,
the rubber composition has 80% or greater of a break point stress when the seal member is stored in an atmosphere of 30 degree C. and 90% RH for 7 days relative to before the storage, and
the rubber composition has from A60 to 100 of a surface hardness, and loses the surface hardness such that the surface hardness becomes 0 when the rubber composition is soaked in water at 66 degree C. for 7 days, where the surface hardness is measured 3 seconds after application of a 5-kg load with a durometer type-A at 23 degree C.

2. The rubber composition for downhole tools according to claim 1, wherein in Formula (I), R is an ethyl group, a butyl group, or a hexyl group.

3. The rubber composition for downhole tools according to claim 1, wherein the degradable rubber has a hydrolyzable functional group.

4. A member for downhole tools comprising the rubber composition of claim 1.

5. The rubber composition for downhole tools according to claim 1, wherein the degradation inhibitor is bis-(2,6-diisopropylphenyl) carbodiimide, and the rubber composition comprises 1 to 3 parts by mass of the degradation inhibitor relative to 100 parts by mass of the degradable rubber.

6. The rubber composition for downhole tools according to claim 2, wherein the degradation accelerator is ethyl p-toluene sulfonate, and the rubber composition comprises 3 to 5 parts by mass of the degradation accelerator relative to 100 parts by mass of the degradable rubber.

7. The member according to claim 4, being a seal member.

8. A frac plug comprising a seal member recited in claim 7.

9. A frac plug comprising a seal member,
wherein the seal member exhibits a sealing function by deformation of the seal member due to a pressure applied to the seal member;
the seal member has a break point stress of 80% or greater relative to a break point stress before the storage, when the seal member is stored in an atmosphere at 30 degree C. and 90% RH for 7 days, and
the seal member has from A60 to 100 of a surface hardness, and loses the surface hardness such that the surface hardness becomes 0 when the seal member is soaked in water at 66 degree C. for 7 days, where the surface hardness is measured 3 second after application of a 5-kg load with a durometer type-A at 23 degree C.; and
the seal member comprises a rubber composition comprising a degradable rubber, a degradation accelerator and a degradation inhibitor,
wherein the degradable rubber is an ester-type urethane rubber, the degradation accelerator is ethyl p-toluene sulfonate, and the degradation inhibitor is a carbodiimide compound,
wherein the content of the degradation accelerator is 3 to 5 parts by mass relative to 100 parts by mass of the degradable rubber, the content of the degradation inhibitor is 1 to 3 parts by mass relative to 100 parts by mass of the degradable rubber, and the content by mass of the degradation accelerator is 4/3 to 5 times the content by mass of the degradation inhibitor.

10. The frac plug according to claim 9, wherein the content by mass of the degradation accelerator is 4/3 to 4 times the content by mass of the degradation inhibitor.

* * * * *